(12) United States Patent
Cremonesi et al.

(10) Patent No.: US 9,356,846 B2
(45) Date of Patent: May 31, 2016

(54) AUTOMATED UPGRADING METHOD FOR CAPACITY OF IT SYSTEM RESOURCES

(71) Applicant: Caplan Software Development S.r.l., Milan (IT)

(72) Inventors: Paolo Cremonesi, Milan (IT); Kanika Dhyani, Milan (IT); Stefano Visconti, Brenta (IT)

(73) Assignee: BMC SOFTWARE, INC., Houston, TX (US)

( * ) Notice: Subject to any disclaimer, the term of this patent is extended or adjusted under 35 U.S.C. 154(b) by 247 days.

(21) Appl. No.: 13/650,827

(22) Filed: Oct. 12, 2012

(65) Prior Publication Data
US 2013/0041644 A1    Feb. 14, 2013

Related U.S. Application Data

(63) Continuation of application No. PCT/IB2011/051650, filed on Apr. 15, 2011.

(30) Foreign Application Priority Data

Apr. 15, 2010  (WO) .................. PCT/IT2010/000165

(51) Int. Cl.
G06F 9/44       (2006.01)
G06F 13/10      (2006.01)
G06E 1/00       (2006.01)
H04L 12/26      (2006.01)
(Continued)

(52) U.S. Cl.
CPC ............ *H04L 43/04* (2013.01); *G06F 11/3452* (2013.01); *G06Q 10/06* (2013.01)

(58) Field of Classification Search
CPC ............ G06F 11/3442; G06F 11/3447; G06F 11/3452; G06F 11/3457; G06F 11/3466; G06Q 10/06; H04L 43/02; H04L 43/04

USPC .......... 703/21, 22; 709/224, 226; 706/16, 21, 706/22
See application file for complete search history.

(56) References Cited

U.S. PATENT DOCUMENTS

2005/0038729 A1 *  2/2005  Hsu et al. ........................ 705/37
2008/0033991 A1    2/2008  Basak et al.

FOREIGN PATENT DOCUMENTS

EP           1739558 A1    1/2007

OTHER PUBLICATIONS

International Search Report and Written Opinion received for Patent Application No. PCT/IT2010/000165, mailed on Jan. 24, 2011, 8 pages.
(Continued)

*Primary Examiner* — Kandasamy Thangavelu
*Assistant Examiner* — Andre Pierre Louis
(74) *Attorney, Agent, or Firm* — Brake Hughes Bellermann LLP

(57) ABSTRACT

Embodiments provide a method for performing an automatic execution of a Box and Jenkins method for forecasting the behavior of said dataset. The method may include pre-processing the dataset including providing one or more missing values to the dataset, removing level discontinuities and outliers, and removing one or more last samples from the dataset, obtaining a trend of the pre-processed dataset including identifying and filtering the trend out of the dataset based on a coefficient of determination methodology, detecting seasonality to obtain a resulting stationary series including computing an auto correlation function of the dataset, repeating the detecting step on an aggregate series of a previous dataset, and removing detected seasonality based on a seasonal differencing process, and modeling the resulting stationary series under an autoregressive-moving-average (ARMA) model.

17 Claims, 6 Drawing Sheets

(51) Int. Cl.
*G06F 11/34* (2006.01)
*G06Q 10/06* (2012.01)

(56) References Cited

OTHER PUBLICATIONS

International Search Report and Written Opinion received for Patent Application No. PCT/IB2011/051650, mailed on Jul. 27, 2011, 10 pages.

International Preliminary Report on Patentability received for Patent Application No. PCT/IT2010/000165, issued on Oct. 16, 2012, 5 pages.

International Preliminary Report on Patentability received for Patent Application No. PCT/IB2011/051650, issued on Oct. 16, 2012, 7 pages.

Lu et al., "Automated box-Jenkins forecasting modelling", Automation in Construction vol. 18 No. 5, Aug. 2009, pp. 547-558.

* cited by examiner

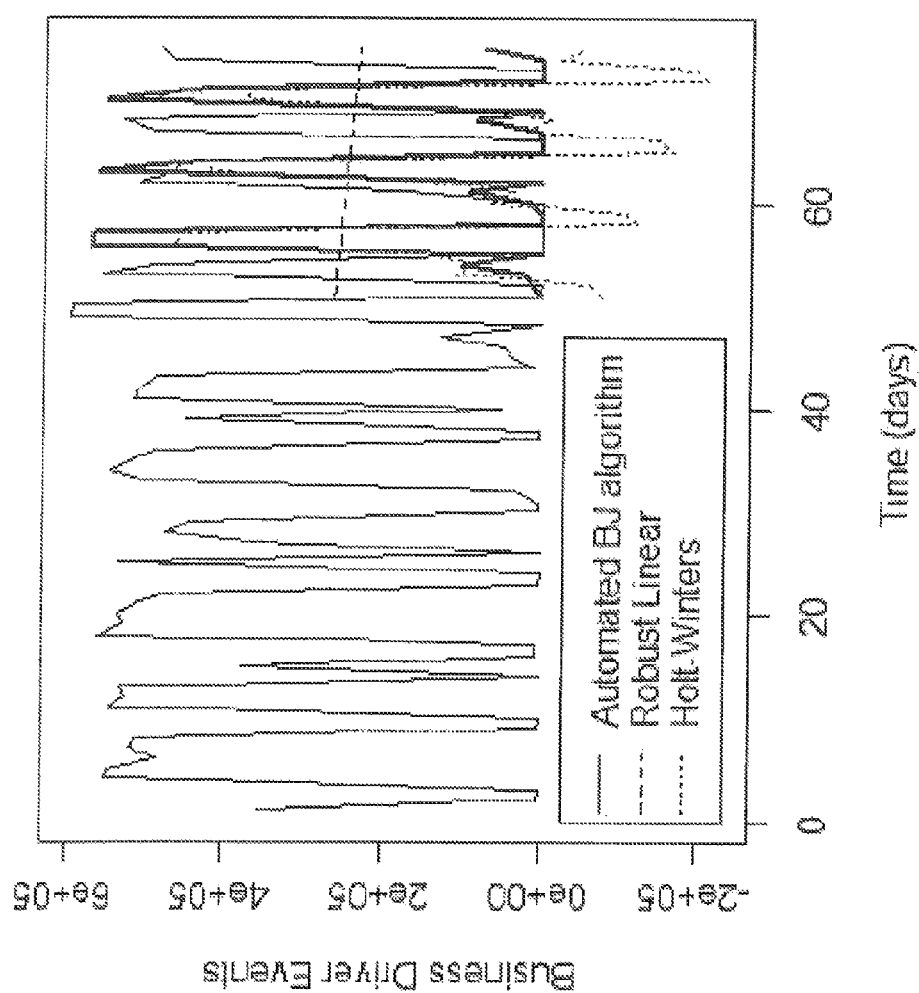
Fig. 4. Cross validation on a workload series

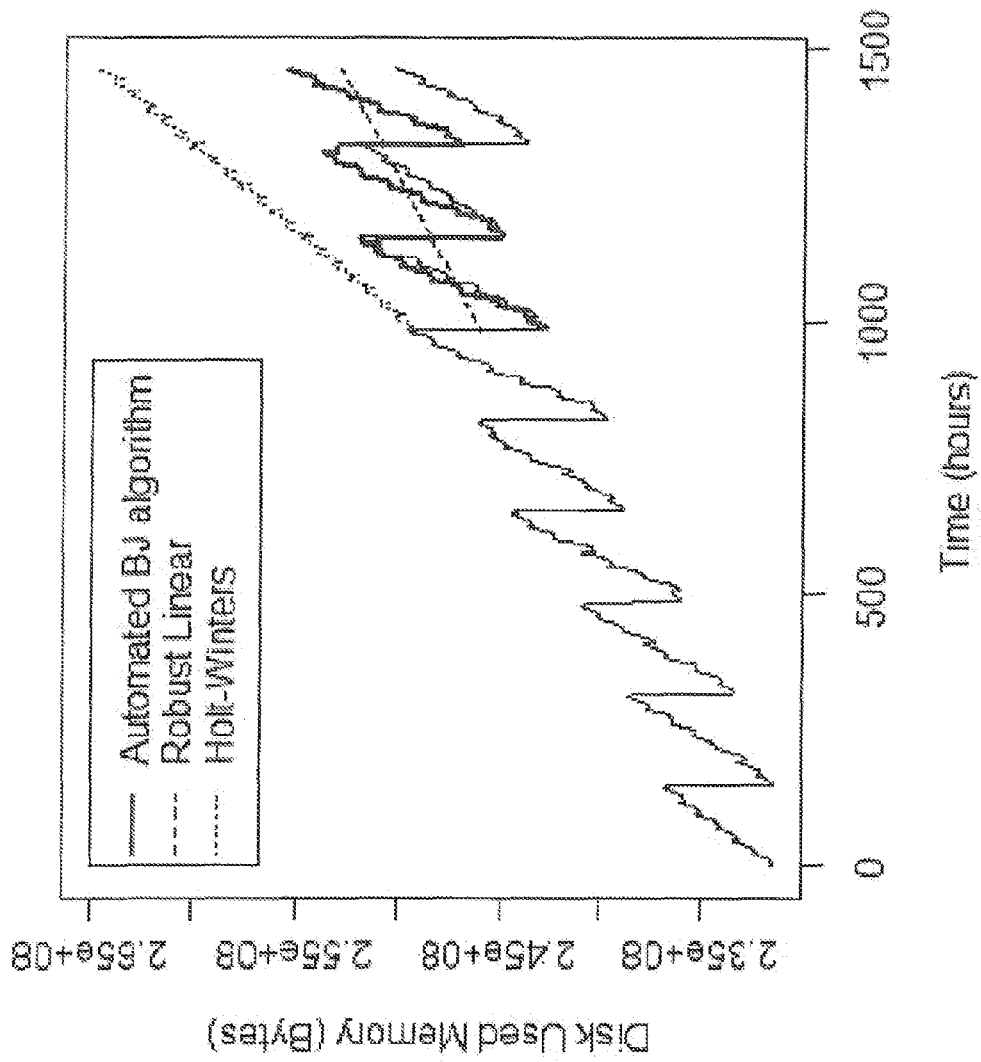
Fig. 5. Cross validation on a performance series

TABLE 1
Table of results for workload data

|  | MAPE ||| RMSE ||| ER |||
|---|---|---|---|---|---|---|---|---|---|
|  | BJ | RL | HW | BJ | RL | HW | BJ | RL | HW |
| BUSINESS DRIVER unbounded metrics |||||||||||
| $\mu$ | 0,26 | 0,27 | 0,28 | 40016873 | 40773746 | 40001869 | 0,13 | 0,09 | 0,11 |
| $\sigma$ | 0,29 | 0,24 | 0,26 | 80848278 | 83944531 | 79356946 | 0,15 | 0,16 | 0,13 |
| Test |  | = | = |  | = | = |  | = | = |
| BUSINESS DRIVER events |||||||||||
| $\mu$ | 0,06 | 0,20 | 0,31 | 21263,53 | 36205,17 | 36267,19 | 0,06 | 0,38 | 0,39 |
| $\sigma$ | 0,01 | 0,09 | 0,16 | 14081,25 | 20561,75 | 21609,62 | 0,07 | 0,23 | 0,25 |
| Test |  | + | + |  | + | + |  | + | + |
| DISK LOAD metrics |||||||||||
| $\mu$ | 0,09 | 0,15 | 0,07 | 0,955462 | 2,033 | 0,717345 | 0,06 | 0,07 | 0,09 |
| $\sigma$ | 0,22 | 0,22 | 0,12 | 1,409767 | 3,346179 | 1,003655 | 0,06 | 0,07 | 0,08 |
| Test |  | = | = |  | = | = |  | = | = |
| TECHNICAL PROXY unbounded metrics |||||||||||
| $\mu$ | 0,12 | 0,17 | 0,11 | 795324,3 | 1222423 | 978627,3 | 0,07 | 0,07 | 0,09 |
| $\sigma$ | 0,15 | 0,24 | 0,14 | 983125,4 | 1275231 | 1058162 | 0,09 | 0,10 | 0,11 |
| Test |  | = | = |  | = | = |  | = | = |
| TECHNICAL PROXY rate metrics |||||||||||
| $\mu$ | 0,21 | 0,27 | 0,23 | 407,5761 | 450,0306 | 476,3718 | 0,09 | 0,10 | 0,08 |
| $\sigma$ | 0,21 | 0,24 | 0,23 | 676,6187 | 646,0088 | 881,9169 | 0,12 | 0,15 | 0,12 |
| Test |  | + | = |  | = | = |  | + | + |
| TECHNICAL PROXY utilization metrics |||||||||||
| $\mu$ | 0,17 | 0,27 | 0,22 | 82784,67 | 100649 | 113199,1 | 0,07 | 0,12 | 0,14 |
| $\sigma$ | 0,13 | 0,15 | 0,18 | 183122,3 | 219284,8 | 232622,1 | 0,09 | 0,13 | 0,20 |
| Test |  | = | = |  | = | + |  | = | = |

Fig. 6

TABLE 2
Table of results for performance data

|   | MAPE | | | RMSE | | | ER | | |
|---|---|---|---|---|---|---|---|---|---|
|   | BJ | RL | HW | BJ | RL | HW | BJ | RL | HW |
| CPU unbounded metrics | | | | | | | | | |
| $\mu$ | 0,257 | 0,371 | 0,261 | 5,486 | 5,762 | 6,320 | 0,040 | 0,067 | 0,051 |
| $\sigma$ | 0,278 | 0,259 | 0,264 | 6,686 | 6,897 | 9,848 | 0,043 | 0,043 | 0,053 |
| Test | | = | = | | = | = | | = | = |
| CPU utilization metrics | | | | | | | | | |
| $\mu$ | 0,107 | 0,190 | 0,154 | 0,208 | 0,262 | 0,239 | 0,088 | 0,100 | 0,114 |
| $\sigma$ | 0,036 | 0,112 | 0,080 | 0,104 | 0,103 | 0,121 | 0,037 | 0,034 | 0,126 |
| Test | | + | = | | = | = | | = | = |
| DB unbounded metrics | | | | | | | | | |
| $\mu$ | 0,180 | 0,193 | 0,241 | 14207573 | 22304496 | 22836586 | 0,129 | 0,157 | 0,227 |
| $\sigma$ | 0,200 | 0,173 | 0,242 | 32112011 | 46436366 | 63833547 | 0,200 | 0,201 | 0,254 |
| Test | | = | = | | = | = | | = | = |
| DB rate metrics | | | | | | | | | |
| $\mu$ | 0,297 | 0,505 | 0,335 | 4,596 | 5,787 | 5,515 | 0,084 | 0,073 | 0,122 |
| $\sigma$ | 0,288 | 0,338 | 0,279 | 4,071 | 5,422 | 5,006 | 0,103 | 0,092 | 0,158 |
| Test | | + | = | | = | = | | = | = |
| DB utilization metrics | | | | | | | | | |
| $\mu$ | 0,257 | 0,284 | 0,274 | 0,081 | 0,094 | 0,102 | 0,030 | 0,029 | 0,024 |
| $\sigma$ | 0,217 | 0,253 | 0,236 | 0,103 | 0,131 | 0,095 | 0,029 | 0,025 | 0,020 |
| Test | | = | = | | = | = | | = | = |
| MEMORY unbounded metrics | | | | | | | | | |
| $\mu$ | 0,139 | 0,207 | 0,145 | 5016697328 | 7396859658 | 5235147807 | 0,165 | 0,187 | 0,190 |
| $\sigma$ | 0,152 | 0,236 | 0,186 | 11082998671 | 14795180059 | 11894548717 | 0,212 | 0,229 | 0,213 |
| Test | | = | = | | = | = | | = | = |
| MEMORY utilization metrics | | | | | | | | | |
| $\mu$ | 0,110 | 0,123 | 0,109 | 0,187 | 0,224 | 0,194 | 0,168 | 0,160 | 0,166 |
| $\sigma$ | 0,093 | 0,102 | 0,103 | 0,129 | 0,139 | 0,121 | 0,201 | 0,193 | 0,183 |
| Test | | = | = | | = | = | | = | = |
| STORAGE metrics | | | | | | | | | |
| $\mu$ | 0,161 | 0,382 | 0,289 | 2417353942 | 3051701740 | 5052744354 | 0,071 | 0,113 | 0,186 |
| $\sigma$ | 0,217 | 0,537 | 0,362 | 5261162256 | 6073286878 | 7601789361 | 0,148 | 0,139 | 0,181 |
| Test | | + | + | | = | + | | = | + |

Fig. 7

AUTOMATED UPGRADING METHOD FOR CAPACITY OF IT SYSTEM RESOURCES

PRIORITY STATEMENT

This application is a continuation application of and claims priority under 35 U.S.C. §120 to PCT application No. PCT/IB2011/051650 filed Apr. 15, 2011, which claims priority to PCT application No. PCT/IT2010/000165 filed Apr. 15, 2010. PCT application No. PCT/IB2011/051650 and PCT application No. PCT/IT2010/000165 are incorporated herein by reference in their entity.

FIELD OF THE INVENTION

The present invention relates to a prediction method for capacity planning of IT system resources. In particular, it relates to an automated prediction method.

BACKGROUND

As known, capacity planning is very crucial for the efficient management of available resources. In the context of IT infrastructure, it is the science of estimating the space, the computer hardware, software and connection resources that will be needed in some time in the future. The aim of a capacity planner is therefore to find the most cost efficient solution by determining appropriate tradeoffs so that the needed technical capacity/resources can be added in time to meet the predicted demand, however making sure that the resources do not go unused for long periods of time. In other words, it is required to upgrade or update some hardware at the right point in time, so as to cope with the demand without too much anticipate the correct time so as to budget correctly upgrading costs.

Time series analysis is a very vital process for predicting how major aspects of various economic and social processes evolve over time. For a long time now, it is extensively applied in predicting the growth of key business activities, for instance the rise and fall of stock prices, determining market trends amongst others. Due to the rising need of optimizing IT infrastructure to offer better services while minimizing the cost of maintaining and buying the infrastructure, there is a growing necessity of developing advanced methods that automatically trigger hardware upgrading or add-on processes.

Time series analysis applied to an IT infrastructure is based on collecting or sampling data related to signals issued by monitored hardware, so as to build the historical behaviour and hence estimate the future points of the model. This analysis projected in time, is apt to supply specific information for establishing when and how said hardware or software resource will require upgrading or substitution. Upgrading of a certain resource n the IT infrastructure for example intended for a specific task, may occur also as an automatic re-allocation of resources (for example memory banks, disk space, CPU, . . . ) from an other system provisionally allocated to a different task: in such a case the entire upgrading process can be carried out in a completely automatic mode.

The same analysis supplies information about occurrence of events, errors on prediction bands, point in time when given hardware changes should be done or when the given infrastructure will breakdown.

As an example, the following can be reported: based on past behaviour of entities like the number of accesses to or transactions in a web site, a time series analysis can help minimizing user response time by predicting future hardware requests. This constitutes a simple capacity planning situation in a demand-supply scenario where a balance between how much hardware infrastructures need to be installed on the basis of expected number of users and minimizing the loss of profit situations due to a slow web access needs to be determined by a capacity planner.

One of the algorithm mostly employed in the field of time series prediction is the well known Box and Jenkins prediction algorithm (see, for example, G. E. P. Box and G. M. Jenkins, Time Series Analysis: Forecasting and Control. San Francisco, Calif.: Holden-Day, 1976 and J. G. Caldwell, (2007, February), Mathematical forecasting using the Box-Jenkins methodology; this system is able to roughly match well to operate to any condition, regardless of the specific domain wherein it is used. Typically, to tune this algorithm to supply good results for a specific application field, it is required a certain amount of manual intervention to select a number of tuning parameters based on visual observation of the historical behaviour of the specific acquired time series. Of course, this way of proceeding, as such, is not suitable to completely automate the upgrading process.

An object of the present invention it is hence that of supplying a method for hardware upgrading based on a robust time series, prediction in the domain of capacity planning of business and workload performance metrics in IT infrastructure, like business drivers, technical proxy, CPU, memory utilization etc. To achieve the goal, it is desired to develop a completely automated time series prediction method. Having an automated method for performance data, has two-fold advantages: (i) due to the large volumes of data with constantly changing physical characteristics which needs to be regularly analyzed, an automation of reading data, updating of internal parameters and a through extensive analysis is imperative; (ii) human intervention in time series prediction process always has some draw backs as capacity planners are engineers who generally lack a deep mathematical and statistical knowledge that time forecasting experts have.

SUMMARY OF THE INVENTION

The above object is obtained through a method as defined in its essential characteristics in the attached claims.

In particular, the method specified relies on a forecasting algorithm based on the Box and Jenkins prediction algorithm with added functionalities which, on the basis of proper identification of characteristic properties of the data set, is able to boost the accuracy of prediction and of the hardware upgrading process.

The algorithm is completely automated and is designed for an unskilled capacity planner requiring no prior knowledge in this area and no manual intervention. To achieve this end, apart from all the other phases of the algorithm, the main core of the algorithm comprising the Box and Jenkins prediction algorithm has also been completely automated.

This algorithm is very suited and tailored for time series coming from the workload and performance domains in IT systems, since they have a lot of internal behaviour like long range trends, long term and short term seasonalities and dynamics that evolve independently of each other, representing the different physical contribution to the final structure of the data.

For this specific domain of data, the method of the invention has a clear edge over other popular forecasting methods like Robust Linear regression (P. J. Rousseeuw and A. M. LeRoy. Linear regression and outlier detection. Hoboken: Wiley, 2003), which can only capture long term trends without giving any further insight on smaller granularity data, Holt-Winters (P. S. Kalekar, "Time series forecasting using Holt-Winters exponential smoothing", December 2004), which provides a prediction based on the trend and seasonality in the data but is not robust to anomalies, the Random Walk algorithm (N. Guillotin-Plantard and R. Scott, Dyanim random walks: theory and applications. Oxford, UK: Elsevier, 2006), especially used for stock forecasting, which is suited only for short-range perspective as it predicts on the basis on the last observation and does not take the general trend into account, and the Moving Average set of algorithms (P. J. Brockwell and R. A. Davis, Time series: theory and methods. 2nd ed. New York: Springer, 1991), which assume a relation between the short and long term perspective by defining a user threshold and generally work well only if seasonalities in the data are regular and cyclic.

BRIEF DESCRIPTION OF THE DRAWINGS

Further features and advantages of the system according to the invention will in any case be more evident from the following detailed description of some preferred embodiments of the same, given by way of example and illustrated in the accompanying drawings and tables, wherein:

FIG. 4 is a cross validation on workload series showing comparison amongst different algorithms.

FIG. 5 is a cross validation on performance series showing comparison amongst different algorithms.

FIG. 6 (Table 1) is a table of results for workload data showing comparison amongst different algorithms.

FIG. 7 (Table 2) is a table of results for performance data showing comparison amongst different algorithms.

DETAILED DESCRIPTION OF A PREFERRED EMBODIMENT OF THE INVENTION

Figure 1:
FIG. 1 is a block diagram showing the main steps of the prediction method according to the invention.

The Box and Jenkins approach is a complex forecasting method which is known since 1976. This framework is based on the assumption that each time series x(t) can be modelled as follows:

$$x(t)=f(T(t);P(t);S(t));  \quad (1)$$

where T(t) represents the trend, P(t) the periodic components and S(t) a stationary process.

A major pitfall of this algorithm is that it requires—as mentioned above—substantial manual work and a deep statistical knowledge. For instance this algorithm is based on the determining of the parameters of the ARMA model which cannot be trivially inferred from the data. Up till now, this was done by iterating over p and q, leading to high number of possible combinations and hence it is high demanding for computing resources and doesn't allow to get a solution in real time.

Due to the peculiarity of IT systems data, in addition to completely automating the prediction process, several components have been added to the Box and Jenkins algorithm to give an informed intelligent prediction. These procedures identify some characteristic behaviours of the series, which are known as features and are selectively used according to the invention. A list of 35 important features have already been suggested in the art, which can be broadly classified as domain knowledge, functional form, context knowledge, causal forces, trend, seasonality, uncertainty and instability. While some of the features listed cannot be automated, some others are not suited for the performance and workload data. After an in-depth analysis, according to the invention a subset of 20 features has been chosen and then merged into 6 main characteristics to be detected. Those characteristics have been splitted and allotted to two different treatment stages of the process: some of them to a pre-processing step, while some others in the other sections.

In particular, the method according to the invention, after having collected (over time) a dataset of hardware performance signals coming from a monitored IT system, is relying on a treatment process of said dataset which is divided in 5 main phases (see FIG. 1): (a) pre-processing of the data, (b) identification of trend, (c) seasonal components analysis, (d) ARMA modelling and (e) final prediction of the time series, (a) Pre-Processing Stage As the name suggests, in this stage the algorithm prepares the dataset for further analysis. This preamble is very crucial to the accuracy of the final prediction of the dataset, as solving anomalies in the data leads to a cleaner exploration of the series structure. In the following, some of the features that strongly characterize each time series and that are used to compute an informed pre-processing of the data is described.

(a.1) NA values

In real applications, i.e. in IT systems resources, many series contain missing values (the abbreviation "NA" stands for "Not Available"). These lacks of information are caused by the missing data during collection (the machine in charge of the acquisition is down for some reason) or by the in consistency of the data with the domain of the metric. According to the invention, each missing observation is replaced by the median of the k closest samples (default is k=5): the median, in fact, maintains the general behaviour of the series and in addition is not affected by extreme values (unlike the mean), thereby not distorting the model components (trend and seasonality).

(a.2) Level Discontinuities

A level discontinuity is a change in the level of the series, which usually appears in the form of a step. These jumps can be caused by occasional hardware upgrades or changes in the physical structure of the monitored IT applications. To detect level discontinuities, a set of candidate points is created using Kullback-Leibler divergence (see W. N. Venables, D. M. Smith, (December 2008). For each point of the time series, the deviation between its backward and forward window is computed. The resulting vector is filtered through a significance threshold and the remaining points constitute the change points in the series, which are the required level discontinuities. To fitter further level jumps, the algorithm provides another method, which works in two steps: (i) an alternative list of candidate jump points is created: considering the second difference of the series, the procedure takes care of samples in which it is greater than half (as default) of the standard deviation of the dataset; (ii) a seasonal analysis is computed to this vector of candidates, to evade peaks at known periodic lags to be considered as level discontinuities. Thanks to this 2-step filter, only jumps of considerable entity and concrete meaning are selected and adjusted.

(a.3) Outliers

Outliers are values that deviate substantially from the behaviour of the series. Their identification is crucial for the goodness of the final forecast of the data, as the presence of strange samples in the time series can lead to big errors in the determination of the parameters for the model of the prediction. In addition to these points, there are samples which appear as anomalous points as their behaviour differs from that of the data. However, in real world these points have a physical significance and are known as events. Events normally represent some hardware upgrades or changes in the system which occur either in isolation or may occur at periodic intervals. Both outliers and events are obtained in the vector of change points got using the Kullback-Leibler function. Change points are calculated using a boxplot analysis conducted at all intervals, the values in these intervals over the whisker point are generally considered anomalous. To distinguish events from outliers, this list of unlabeled points is then refined by the event detection box, which identifies seasonalities in this vector (if existing) by automatically detecting the starting point of the seasonal sequence and producing a list of events in the data. All the other points are labelled as outliers. The event detection procedure ensures that events are considered as seasonal elements and properly dealt with the dedicated section of the algorithm.

(a.4) Last Period Analysis

It is known that statisticians think that predicting a time series, with a highly corrupted last period, can bring to such huge conceptual mistake that the whole forecasting process could be totally compromised. Handling suitably anomalies in the last part of the series is really important for the final prediction of the data. Hence, according to the invention, the last P samples (P is the granularity of the data) of the dataset is left out, while a P-step ahead forecast (using the estimation method itself) is computed. It produces the estimated value for the last period, which is judged to be unusual or not. If it is, the real values are substituted by the just computed prediction. Then, the last sample of the obtained data series is ignored, and its unusuality is judged through a procedure specular to the one above. This filter of the earliest samples (i.e. the most significant samples of the trailing edge) is very important, as dealing series with stable last portion leads to a more accurate prediction of the data.

(a.5) Additional Features

Other than these widely known features, the prediction method of the invention has been equipped with a set of alternative identifiers, which are useful to adequately characterize aspects of the specific performance and workload data of IT systems. In particular, IT time series are not allowed to take negative values, as they represent percentages or natural metrics, which by definition cannot be negative. Because of that, the prediction shall be limited to prevent the forecast to reach negative values.

Further, it is detected if the series constitutes a utilization dataset, so that a lower and an upper bound can be put. In some cases, in real situations, the series shows a non trivial lower (or upper) bound: this limit must be correctly detected and considered, as letting forecasts go under that boundary causes infeasible situations in terms of physical meaning of the data. To identify the bound, the mode of the series is calculated: if it is the lower (or upper) bound of the data and has a sufficiently high frequency, then it is considered the base of the data, which is labelled as a trampoline series.

(b) Identification of Trend

Once the time series has been cleaned from all anomalous behaviours, and therefore can be considered a pure and meaningful expression of the process underlying the data, it shall be treated according to the three steps illustrated in FIG. 1.

The trend part of the data is, in most of the cases, the most relevant one as it dominates the whole series. For this reason, performing a good identification of the general direction of the data usually leads a good final prediction of the series. To accomplish this job, the coefficient of determination ($R^2$) technique is suggested to be used (see, for explanations, L. Huang and J. Chen, "Analysis of variance, coefficient of determination and f-test for local polynomial regression", The annals of statistics, vol. 36, no. 5, pp. 2085-2109, October 2008; E. R. Dougherty, Kim and Y Chen, "Coefficient of determination in non linear signal processing". Signal processing, vol. 80, no. 10 pp. 2219-2235, October 2000.)

The fixed set of possible curves is composed by polynomial functions (linear, quadratic and cubic) and a non linear one (exponential). Initially a heuristic test to detect possible exponential behaviour is computed on the series. Y(t) (which is the output of the pre-processing procedure): the natural logarithm of Y is taken to obtain the slope of the resulting fitting line, which is useful for the further analysis. Supposing, in fact, that Y(t) y T(t) (condition satisfied in almost all real situations), if $$T(t)=a*e^{b*t},$$

than $$\log Y(t) = \log a*e^{b*t} = \log a + \log e^{b*t} = \log a + b*t$$

The slope (b) of the fitting regression line can be used to obtain the proper analytical expression for the exponential arrangement to the series. Afterwards, it is possible to apply a $R^2$ test to the dataset, involving the modelling exponential function just calculated ($e^{b*t}$) and the polynomial ones (t, t2 and t3) cited above. The maximum value of the $R^2$ is the one corresponding to the correct regression.

Once the function is chosen, it is straightforward to find the analytical expression of the best-fitting line (all computer programs for numerical calculations provide a built-in function to fit generic analytical models to a dataset). Sometimes, unfortunately, real world data are very "dirty". The coefficient of determination could be biased by some random circumstance in the data, that could deviate the output of the $R^2$ test (especially if samples are not numerous). To prevent unexpected and undesirable situations of bad adaptation to the data, a threshold is put on the trend test. It, represents the value over which the maximum $R^2$ rate must stay, to be significant. This filter is put to avoid the overfitting of the model, that could rely too much on the original data (which can be corrupted, instead, by some disturbing random factor) with respect to future samples.

(c) Seasonality

In most of the real world situations in IT systems, every aspect of the data is highly influenced by time. All time series have a granularity, which is the interval between which data are collected. Data, for example, can be gathered hourly, weekly or yearly; they can even be picked at a certain granularity and then be processed to obtain different time intervals. Often, datasets show time-dependent correlation, like events or usual realizations as well, that tend to be periodic in their appearances. IT data, in this sense, are very significant, as particularly expressive of this crucial aspect of datasets.

According to the invention there is provided an entire process block that deals seasonal traits in the data. It is divided in 3 parts: the first two handle respectively the original detrended dataset (Z(t)) and its aggregation with respect to the basic seasonality, while the third one uses the information acquired from the previous two to prepare the series for the next steps of the process, c.1 Original Data Investigation To detect if seasonality is a relevant component of the series, an analysis on the Auto Correlation Function (ACF) over dataset is computed. The procedure for the identification of seasonal components detects sufficiently high peaks (local minima or maxima greater than a threshold) in the ACF, which represents the period of the relevant seasonal components in the data. This test highlights regular behaviours of the series, that usually denote specific qualities of the process underlying the data. The process can handle the ACF-test output with the following 3 different approaches.

1. Granularity-based. A seasonal component in the original data is considered relevant only if its period is equal to the time interval. This approach allows to discover regular dependencies which relies to correlation that have a concrete physical meaning connected to the time elapsing. This is the default option of the algorithm;

2. Greedy. This approach instead supposes that every period labelled as significant by the Auto Correlation Function analysis is acceptable and potentially relevant. The algorithm chooses the highest peak returned by the seasonality test and assumes the corresponding period as the one driving the series;

3. Custom. It is possible finally to leave to the user the choice to input a set of feasible periods to the automatic process. The procedure chooses the lowest period which is both in this set and in the relevant periods returned by the ACF-test. This option has been added to let the user the possibility to customize (if needed) his analysis and also to enable the algorithm to manage peculiar time series that can rarely appear in real applications. A data collection, for instance, can be conducted from Monday to Friday and stopped in the week-end (due to the closing of the offices, for example). In this case, a possibly relevant seasonality would have period 5 (rather than 7, as in usual weekly dependencies), and due to this selection the algorithm can properly handle it. Obviously, this procedure could return no period, to express that seasonality is not important in the evolution of the data.

c.2 Aggregated Data Investigation

Once the original series has been dealt, a deeper analysis is made on the dataset. The data vector is divided in K groups and each of them is composed of T elements, T is the value returned by the previous processing (if seasonality has not been considered relevant in the data, then it is set to time interval P; if the last group has $\check{T}$ elements and $\check{T}<T$, it is filled adding $T-\check{T}$ samples equal to the mean of the series). Hence, the so called aggregate series is obtained, where each sample $Z'(j)$ ($j \times \{1, 2, \ldots, K\}$) is defined as $$\Sigma_{i=0}^{T-1} Z(j-1)$$

At this point, the ACF-test can be applied to this series, to find possible significant seasonal components in the data (T'). This additional periodic examination allows to discover specific patterns, which are connected to "double seasonalities" in the structure of the metric that is modelling the data. The applied method for this procedure is the greedy one, which does not forbid a period to be considered significant by the algorithm. This choice takes into account the complicated dynamics of performance dataset. IT aggregated time series, in fact, do not have fixed periodic patterns but can show regularities at any sample lag.

c.3 Seasonal Differencing

Once even the aggregated series has been fully analyzed, Z(t) can be taken in consideration again and information obtained in the two previous sections can be used. Seasonal differencing is a form of adjustment, whose aim is to remove the seasonality explicitly from the dataset. In general, given a time series X(t) (of length n) and the season Δ, the difference series is obtained as follows:

$$S(j)=X(j+\Delta)-X(j) \; j \times \{1,2,\ldots,n-\Delta\} \quad (2)$$

The season parameter can vary, according to the possible results of the previous inspection of the data:

if aggregated series showed relevant seasonality (independently from original series' result), then $$\Delta=T^*T';$$

if aggregated data did not reflect periodic regularities, while original data did, then $$\Delta=T;$$

otherwise, if neither the original series, nor the aggregated one showed seasonality, then seasonal differencing can not be applied, as periodicity is not thought as relevant in the structure of the data.

The obtained series S(t) is accordingly deprived of all its seasonal components and the parameter Δ is kept for the further reapplication of the seasonality upon the final stage of prediction.

(d) ARA Analysis

Dataset resulting from all previous procedures is a stationary series S(t), which can be modelled as an ARMA(p,q) process (see, for example, G. E. P. Box and G. M. Jenkins, Time Series Analysis: Forecasting and Control. San Francisco, Calif.: Holden-Day, 1976). Therefore, investigations to be accomplished on the dataset are the detection of the order of the model and its identification.

There are some different approaches to handle this portion of the Box and Jenkins analysis (see for example, Y. Lu and S. M. AbouRizk, "Automated Box Jenkins forecasting modelling", Automation in construction, vol. 18, pp. 547-558, November 2008) and the details of the processes to be used will not be described here, since they are well known in the field and they do not form specifically part of the present invention.

According to a preferred embodiment of the invention, with the aim of (tightly) reducing the computational time of this procedure, a process tool has been construed which is able to accurately identify the most correct orders of AR an MA portions of the ARMA process, starting from reasonable considerations on the structure of the data. First, the procedure agrees with the one from Lu and Abourizk, about the bounds on the orders, as p and q components greater than 3 would not bring substantial improvements to the modelling goodness and would only complicate the abstraction on the data. This process tool, then, executes an accurate inspection of the 'acf' (a correlation function) and 'pcf' (p correlation function) function, which basically applies rules described in the document S. Bittanti, "Identificazione dei modelli e sistemi adattativi," Bologna, Italy: Pitagora editrice, 2005.

This procedure is concerned with the knowledge acquired directly from the serial correlation among data samples (ad and pcf), that is strongly meaningful for the behaviour of the data and in addition can be computed in a very short time.

After p and q components have been identified correctly, the only thing that is left is the computation of the values of model parameters. This is done by the machine, which uses a traditional MILE (Maximum Likelihood Estimate) method to estimate coefficients that best model the given time series S(t). Once the ARMA model has been built, the system is ready for the final prediction stage of the procedure.

(e) Final Prediction

At this stage, an abstraction of every component of the time series has been produced: hence every obtained model can be used and extended to any future collected data, to produce a forecast of the dataset. The prediction of time series is computed following the inverse order, with respect to the identification, applying results from the less relevant component to the dominant one.

e.1 ARMA

The modelling of S(t) allows to produce an analytical expression for the serial correlation of the series with past values and noise sequences. The forecast generated from this information is particularly relevant for a short prediction horizon (in the first future samples), while far unknown samples are less affected by the ARMA contribution, e.2 Seasonal Differencing Expression (2) explained how to obtain the difference series without the seasonal components. Now seasonality must be reapplied to build the desired dataset Ž(t). Known samples are trivially reacquired with the following:

$$\check{Z}(j)=Z(j) \, j\times 1,2,\ldots,T \quad (3)$$

$$\check{Z}(j+T)=Z(j)+S(j) \, j\times 1,2,\ldots,n-T \quad (4)$$

Future samples, instead, are obtained, thanks to the ARMA forecast, using:

$$\check{Z}(n+j)=Z(n-T+j(\bmod T))+\hat{S}(n-T+j) \, j\times 1,2,\ldots,H \quad (5)$$

where H is the desired forecasting horizon. This procedure puts particular care on the last period of the data (which is, as discussed previously, a very important portion of the dataset). In equation (5), in effect, the attention of the forecast is focused on Z(n−T+j(mod T)), that basically considers only the last period of the series, joining it with the prediction of the stationary component of the data, to replicate seasonality over time. Please notice that parameter T includes all interesting seasonalities of the data and allows the dealing of multiple periodic components, without any other additional information.

e.3 Trend

Finally, the identified regression curve of the data is reapplied. In most performance data series, trend is the most relevant component of the data. Therefore, to perform effective capacity planning, the general behaviour of a time series is crucial and its proper detection and application becomes the most critical section of any forecasting procedure. That is why so much attention is paid in the trend identification section of this procedure. Finally, after having considered detected features (reapplication of level discontinuities and outliers, etc.), the definitive prediction is computed.

Based on this computed prediction, the method according to the invention further triggers a proper procedure, depending on the specific hardware employed and monitored, to upgrade said hardware, either allocating to the system some un-employed shared resources of an other system or issuing an alarm for the IT manager to start a manual upgrading procedure.

As an example, if the prediction method is based on a dataset representing the storage space usage in a hard-disk, the computed prediction based on the historical usage data vs time of the hard-disk, gives and indication that at time t the hard-disk capacity will be used up to 99%. The process is hence set so that, at time t−n before reaching complete usage of said resource, more disk space capacity is allocated to that IT system.

According to a preferred embodiment of the invention, to provide a more robust estimation of unknown forecasted samples, prediction bands are computed in addition to the estimated predicted values of the dataset. These prediction bands are calculated as a function of the forecasted value and the chosen confidence on error of prediction: they represent the region (i.e. upper and lower bounds) in which the prediction lays with a certain probability.

Evaluation and Example

The accuracy of the prediction method is evaluated on data coming from IT metrics, roughly categorized in two subsets: workload and performance data. The first one includes datasets representing raw business data, directly taken from the IT activities: for example Business Driver, which monitor user-based metrics (number of requests, logins, orders, etc.), Technical Proxy, which indirectly measure business performance (rates, number of hits, volumes of data involved in transactions, etc.) and Disk Load, describing the load addressed to memory devices. The second one is composed of time series which can be workload data after the processing applied by queuing network models or performance series, coming directly from IT architecture devices (CPU's, storage systems, databases, etc.).

The accuracy of the method according to the invention has been assessed through visual judgement of cross-validation, comparing the results with some others which can be obtained from other popular forecasting methods, like robust linear (RL) and Holt-Winters (HW). In both cases, the method according to the invention has been judged superior.

Figure 2:
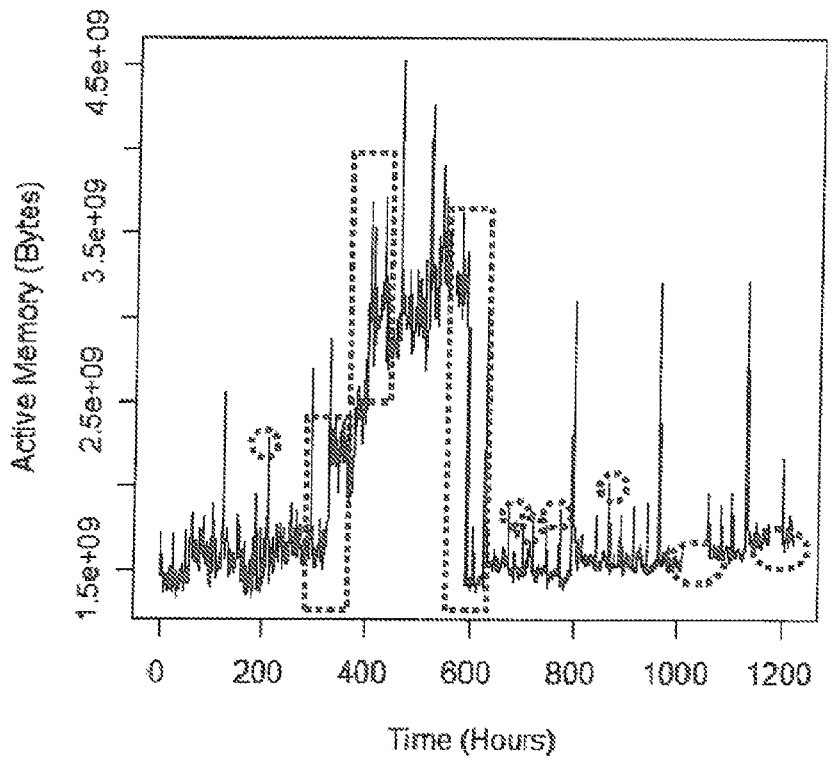
FIG. 2 is an exemplary time series representing the active memory of a IT machine.
Figure 3:
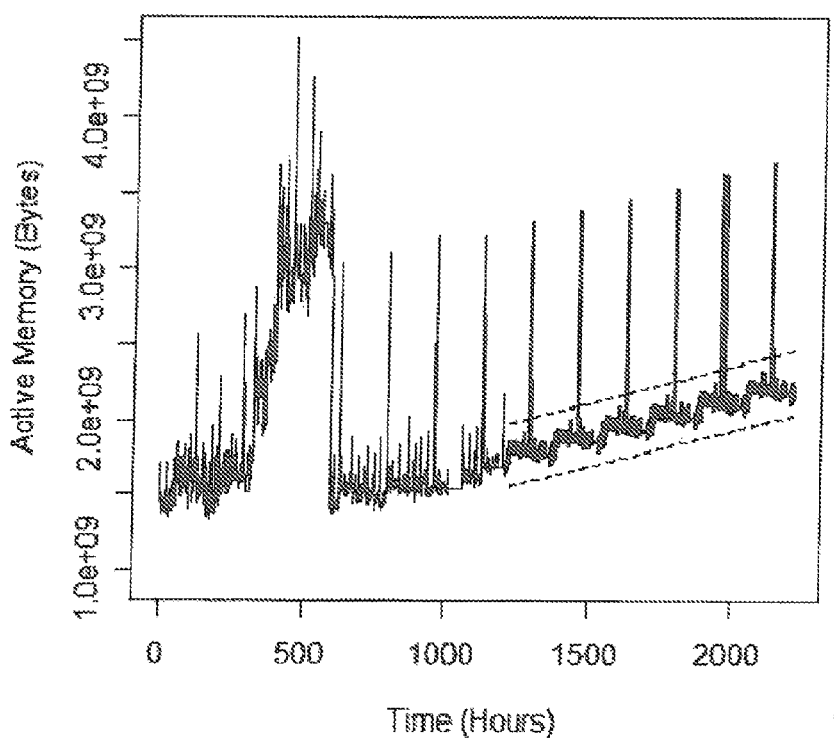
FIG. 3 is a plot showing forecast and prediction bands of a test series.

In FIG. 2 is shown a real dataset obtained monitoring the number of bytes of active memory of a computing machine. The method of the invention has been found able to automatically detect and recognize missing values (dashed ovals in the figure), which shall be filled as explained above, the level discontinuities (rectangular shapes), which shall be adjusted for the correct automatic analysis, and the outliers (dashed circles) which are well considered in the pre-processing stage. In particular, some of outliers were not detected as anomalous points, but correctly recognized—through the event detection procedure—as usual periodic peaks due to seasonality; trend analysis on the cleaned series fits an upward linear trend to the series. The seasonal detection, instead, discovers a double seasonality in the data. The dataset, in fact, shows a seasonal component of period 24 (number of hours in a day) while the aggregate series is dominated by a seasonality of period 7 (number of days in the week). Hence, the hourly time series tends to replicate its behaviour every week. This aspect of the dataset is handled by the seasonal differencing, which combines the ARMA prediction (p=q=3) and the identified trend to make an appropriate forecast. FIG. 3 shows the initial series, together with its final prediction (bold line) for 408 samples (17 days), along with the prediction bands (dashed line), computed for a 75% confidence.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

Evaluation and Example of Comparison with Other Algorithms

To demonstrate the efficiency of the automated prediction algorithm, which intelligently uses the underlying behavior of the time series, with other algorithms, we present extensive cross-validation results. Our algorithm is compared with two different forecasting methods, widely used in common data analysis applications; Robust Linear (RL) and Holt-Winters (HW). The first one is very popular in the time series forecasting, because of its easy understanding, its robustness with respect to outliers and to high variable behaviors. Robust linear, anyway, extracts a very basic model from the data, and so does not take seasonal dynamics in the series in consideration. Holt-Winters, instead, is an exponential smoothing method, which handles both trend and seasonality behaviors. The major drawback of this forecasting algorithm is the lack of an informed periodic analysis: data is just smoothed and seasonality of the last portion of the dataset is replicated over time, without knowing if the periodic component is relevant and ignoring multiple seasonalities. Finally, both these methods lack the ARMA analysis, which is important in detecting the serial correlation in the time series.

The performance of the algorithm is evaluated through the three performance indices.

Performance Indices

Let $\hat{y}(j)$ represent the prediction of sample $y(j)$ and N the length of the portion of series used to test the prediction. Firstly, to have a quantitative indicator of the accuracy of our prediction algorithm, we use the most basic performance index: the Root Mean Squared Error (RMSE), which computes the variation of the forecast with respect to the read data, defined as $$RMSE = \sqrt{\frac{\sum_{j=1}^{N}(y(j)-\hat{y}(j))^2}{N}}$$

To obtain an absolute indicator of the goodness of the prediction, a Mean Absolute Percentage Error (MAPE) can be calculated, it is defined as follows:

$$MAPE = \frac{\sum_{j=1}^{N}\left|\frac{(y(j)-\hat{y}(j))}{y(j)}\right|}{N}$$

Finally, the third index we use to evaluate the performance of our prediction algorithm computes a test on each predicted sample separately, calculating the deviation of the forecasted value from the real one. Error(j) is computed as follows:

$$\text{Error}(j) = \begin{cases} 1 & \text{if } \frac{|(y(j)-\hat{y}(j))|}{2\sigma^2} > q_{1-\alpha} \\ 0 & \text{else,} \end{cases}$$

where $\sigma$ is the standard deviation of dataset y and $q1-\alpha$ is the quantile of a normal distribution. Error is therefore a vector with as many zeroes as the number of samples correctly predicted, with the chosen confidence of $(1-\alpha)$. To obtain an absolute indicator of the accuracy of the forecast, we compute the Error Ratio (ER):

$$ER = \frac{\sum_{j=1}^{N}\text{Error}(j)}{N},$$

We set the confidence level for ER index as 95%. For each considered time series, the last third of the data vector is left out of the prediction and used to validate the computed forecast. For each subset a hypothesis test for difference between means is computed: we suppose that for every comparison, the two sampling population (with mean $\mu$ and standard deviation $\sigma$) are normally distributed. Considering two distributions with sample parameters $\mu_1$, $\mu_2$, $\sigma_1$, $\sigma_2$ and lengths $n_1$, $n_2$, we formulate the hypotheses:

$$H_0: |\mu_1-\mu_2|=0$$

$$H_1: |\mu_1-\mu_2|>0$$

We consider $\mu_x=|\mu_1-\mu_2|$ and $$\sigma_x = \sqrt{\frac{\sigma_1^2}{n_1} + \frac{\sigma_2^2}{n_2}}.$$

Then we calculate the z-score $$\frac{\mu_x}{\sigma_x}$$

and the significance threshold $t_{1-\alpha}$, which is the quantile of the t-distribution with min $\{n_1,n_2\}=1$ degrees of freedom. If the z-score is greater than the threshold, than the two distributions are different and the null hypothesis is rejected. In tables 1 and 2, results for different types of workload and performance data are displayed. We do not report computational time taken by the execution of the algorithm, as it is almost always less than a few seconds, which is reasonable, for the purposes of this study. First column indicates the type of parameter shown ($\mu$ is the mean and $\sigma$ is the standard deviation); columns from 2 to 4 shows MAPE values for Box and Jenkins, Robust Linear and Holt-Winters, while columns from 5 to 7 and from 8 to 10 illustrate for the three algorithms respectively the RMSE and the R. Every table shows the results grouped with respect to the type of metric that the series is monitoring. For each group, the mean and the standard deviation of the results vector are displayed, together with the output of previously discussed test. In the "test" row, symbol '+' indicates that the null hypothesis is been rejected in favor of the automated Box and Jenkins algorithm, while a − stands for the acceptance of the null hypothesis. Results of these tests stand the accuracy of our algorithm, in predicting IT time series, with respect to the considered performance indices. The $\mu$ value for MAPE is never over 40%, which in literature is considered a reasonable threshold for the goodness of the forecast.

Further, the $\mu$ value for Error Rate never surpasses 0.2, which implies that 20% of the uncorrect predicted samples is a reasonable percentage. Seeing the results obtained by the null hypothesis test shows that our algorithm is never statistically outperformed by its counter parts, in particular it is significantly better in 43% of the considered subsets of data. Moreover, amongst all the types of data metrics, the algorithm performs best on Business Driver (Events) and Storage data We present two visual examples of cross validation which back our algorithm further.

FIG. 4 shows the cross-validation performed on a time series monitoring the number of events occurring in a web server on a daily basis. This example will clearly illustrate the suitability of our method over the algorithms for this type of time series, in general, datasets of this type show a clear lower bound, which is properly detected by the trampoline identifier, there by evading infeasible situations due to possible negative trend in the data. The instance illustrated in FIG. 4 shows a clear trampoline base represented by value 0, as datasets monitoring events, can not have negative values (as Holt-Winters instead uncorrectly predicts). Furthermore, our automated prediction method detects all basic seasonal components in the data so that the forecast fits the periodic behavior of the series appropriately (unlike Robust Linear algorithm, which is unaware of seasonalities). Our second example shown in FIG. 2 represents the cross-validation test on a hourly sampled storage time series, representing the disk memory used by a machine. Analyzing the data closely shows that there is a double seasonality, arising from daily and weekly fluctuations of the memory occupation over the trend of the series. Capturing this characteristic behavior leads to a more informed prediction, which follows correctly the recurrence of local and global peaks in the data. For this specific time series, the improvement in terms of prediction accuracy of this algorithm with respect to its counterparts is considerable: it reduces the MAPE by 35% and the RMSE by 26% against Robust linear, 80% and 75% respectively against Holt-Winters. Further, none of the predicted values is considered uncorrect (with confidence 95%) and accordingly the ER for automated Box and Jenkins algorithm is 0.

The invention claimed is:

1. A computer-implemented method for predicting capacity of Information Technology (IT) system resources, the computer-implemented method comprising:
   performing an automatic execution of a Box and Jenkins method for forecasting a behavior of a dataset representing a capacity of resources of an IT system, wherein the performing includes:
   (a) pre-processing the dataset, including providing one or more missing values to the dataset, removing level discontinuities by detecting change points corresponding to level discontinuities in the dataset and detecting further level discontinuities using a two-step filter, the two-step filter including creating a vector of candidate jump points and computing seasonal analysis on the vector of candidate jump points to obtain the further level discontinuities, and removing outliers from the vector, and handling anomalies of the dataset by leaving out one or more last samples from the dataset;
   (b) obtaining a trend of the pre-processed dataset including identifying and filtering the trend out of the pre-processed dataset based on a coefficient of determination methodology to generate a detrended dataset;
   (c) obtaining a resulting stationary series by detecting seasonality from the detrended dataset using an auto correlation function of the dataset, detecting seasonality using the auto correlation function on an aggregate series of the dataset, and removing detected seasonality based on a seasonal differencing process;
   (d) modeling the resulting stationary series under an autoregressive-moving-average (ARMA) model; and predicting the behavior of the IT system resources based on execution of steps (b)-(d) in reverse order.

2. The method of claim 1, wherein the dataset is not allowed to take negative values.

3. The method of claim 1, wherein the pre-processing the dataset further includes identifying a boundary value of the dataset by calculating a mode of the dataset to avoid the forecast falling under the boundary value.

4. The method of claim 1, wherein the obtaining the resulting stationary series includes:
   identifying seasonal components of the detrended dataset based on an analysis of the auto correlation function computed over the detrended dataset by detecting in the auto correlation function peaks having local minima or maxima greater than a threshold;
   analyzing an aggregate series of the dataset by dividing a data vector of the dataset into groups representing the aggregate series;
   applying the auto correlation function to the aggregate series to obtain secondary seasonal components of the aggregate series; and
   removing seasonality from the dataset based on at least one of the seasonal components and the secondary seasonal components to obtain the resulting stationary series.

5. The method of claim 1, further comprising:
   allocating additional re-sources to the IT system based on the predicted behavior.

6. The method of claim 1, wherein the dataset includes IT metrics relating to workload and performance data of the IT system.

7. A computer-implemented method of forecasting resources in an Information Technology (IT) system, the computer-implemented method comprising:
   performing an automatic execution of a Box and Jenkins method for forecasting a behavior of a dataset representing a capacity of resources of an IT system, wherein the performing includes:
   (a) pre-processing the dataset, wherein the pre-processing the dataset includes providing one or more missing values to the dataset, removing level discontinuities and outliners from the dataset, and removing one or more last samples from the dataset;
   (b) generating a detrended dataset, wherein generating the detrended dataset includes identifying and filtering a trend out of the preprocessed dataset based on a coefficient of determination methodology;
   (c) obtaining a resulting stationary series of the detrended dataset by identifying first seasonal components of the detrended dataset based on an analysis of an auto correlation function computed over the detrended dataset by detecting in the auto correlation function peaks having local minima or maxima greater than a threshold, analyzing an aggregate series of the dataset by dividing a data vector of the dataset into groups representing the aggregate series and applying the auto correlation function to the aggregate series to obtain second seasonal components of the aggregate series, and removing seasonality from the dataset based on at least one of the first seasonal components and the second seasonal components to obtain the resulting stationary series;
   (d) modeling the resulting stationary series under an autoregressive-moving-average (ARMA) model; and predicting the behavior of the IT system resources based on execution of steps (b)-(d) in reverse order.

8. The computer-implemented method of claim 7, wherein the dataset is not allowed to take negative values.

9. The computer-implemented method of claim 7, further comprising:
   allocating additional resources to the IT system based on the predicted behavior.

10. The computer-implemented method of claim 7, wherein the pre-processing the dataset includes identifying a boundary value of the dataset by calculating a mode of the dataset to avoid the forecast falling under the boundary value.

11. The computer-implemented method of claim 7, wherein the dataset includes IT metrics relating to workload and performance data of the IT system.

12. The computer-implemented method of claim 7, wherein the removing level discontinuities includes detecting change points corresponding to level discontinuities in the dataset and detecting further level discontinuities using a two-step filter, the two-step filter including creating a vector of candidate jump points and computing seasonal analysis on the vector of candidate jump points to obtain the further level discontinuities.

13. A non-transitory computer-readable medium comprising executable code that when executed by at least one processor is configured to:

perform an automatic execution of a Box and Jenkins method for forecasting a behavior of a dataset representing a capacity of resources of an Information Technology (IT) system, wherein the automatic execution of the Box and Jenkins method includes:
(a) pre-process the dataset to remove level discontinuities by detecting change points corresponding to level discontinuities in the dataset and detecting further level discontinuities using a two-step filter, the two-step filter including creating a vector of candidate jump points and computing seasonal analysis on the vector of candidate jump points to obtain the further level discontinuities;
(b) generate a detrended dataset by identifying and filtering a trend out of the preprocessed dataset using a coefficient of determination methodology;
(c) obtain a resulting stationary series by removing seasonality from the detrended dataset;
(d) model the resulting stationary series under an autoregressive-moving-average (ARMA) model; and
predict the behavior of the IT system resources based on execution of steps (b)-(d) in reverse order.

14. The non-transitory computer-readable medium of claim 13, wherein the executable code to remove the seasonality from the detrended dataset includes:
identify first seasonal components of the detrended dataset based on an analysis of an auto correlation function computed over the detrended dataset by detecting in the auto correlation function peaks having local minima or maxima greater than a threshold;
analyze an aggregate series of the dataset by dividing a data vector of the dataset into groups representing the aggregate series and applying the auto correlation function to the aggregate series to obtain second seasonal components of the aggregate series; and
removing seasonality from the dataset based on at least one of the first seasonal components and the second seasonal components to obtain the resulting stationary series.

15. The non-transitory computer-readable medium of claim 13, wherein the executable code to preprocess the dataset includes:
remove one or more last samples from the dataset.

16. The non-transitory computer-readable medium of claim 13, wherein the dataset includes IT metrics relating to workload and performance data of the IT system.

17. The non-transitory computer-readable medium of claim 13, wherein the executable code further includes instructions to:
allocate additional resources to the IT system based on the predicted behavior.

* * * * *